United States Patent [19]

Connett et al.

[11] 4,140,661
[45] Feb. 20, 1979

[54] FOAM PRODUCING METHOD

[75] Inventors: Michael Connett, Timperley; Peter Connett, Stretford, both of England

[73] Assignee: Beaconet Engineering Company, Limited, Salford, England

[21] Appl. No.: 750,166

[22] Filed: Dec. 13, 1976

[30] Foreign Application Priority Data

Dec. 20, 1975 [GB] United Kingdom ............... 52262/75

[51] Int. Cl.² ............................................. C08N 9/30
[52] U.S. Cl. ...................................... 521/188; 264/39; 521/78; 521/917; 422/133
[58] Field of Search ........................ 260/2.5 F; 264/39

[56] References Cited

U.S. PATENT DOCUMENTS

| | | | |
|---|---|---|---|
| 2,862,239 | 12/1958 | Pollard et al. | 264/39 |
| 3,150,108 | 9/1964 | Villi | 260/2.5 F |
| 3,186,959 | 6/1965 | Shriver et al. | 260/2.5 F |
| 3,256,067 | 6/1966 | Shriver et al. | 260/2.5 F |
| 3,290,260 | 12/1966 | Buccigross | 260/2.5 F |
| 3,312,639 | 4/1967 | Justice | 260/2.5 F |
| 3,329,631 | 7/1967 | Pilgrim | 260/2.5 F |
| 3,414,526 | 12/1968 | Mason | 260/2.5 F |
| 3,488,412 | 1/1970 | Bielfeldt et al. | 264/39 |
| 3,631,134 | 12/1971 | Scheuermann et al. | 260/2.5 F |
| 3,855,161 | 12/1974 | Bauer | 260/2.5 F |
| 3,979,341 | 9/1976 | Widman | 260/2.5 F |

Primary Examiner—Morton Foelak
Attorney, Agent, or Firm—Lawrence E. Laubscher

[57] ABSTRACT

This invention relates to methods and apparatus for successively dispensing predetermined quantities of urea formaldehyde foamed resin mixture having as constituents a resin component and a hardener component in which a prefoamed one of said components and the other component are independently fed under pressure to a mixing chamber where they are mixed and from which, they are dispensed, any residue of the urea formaldehyde foamed resin mixture left in the mixing chamber after said predetermined quantity has been dispensed therefrom being swept and removed prior to the mixing chamber being supplied with the next batch of said components.

The present invention is particularly useful for filling pre-cast cavity building blocks with insulating foamed material.

4 Claims, 1 Drawing Figure

U.S. Patent  Feb. 20, 1979  4,140,661
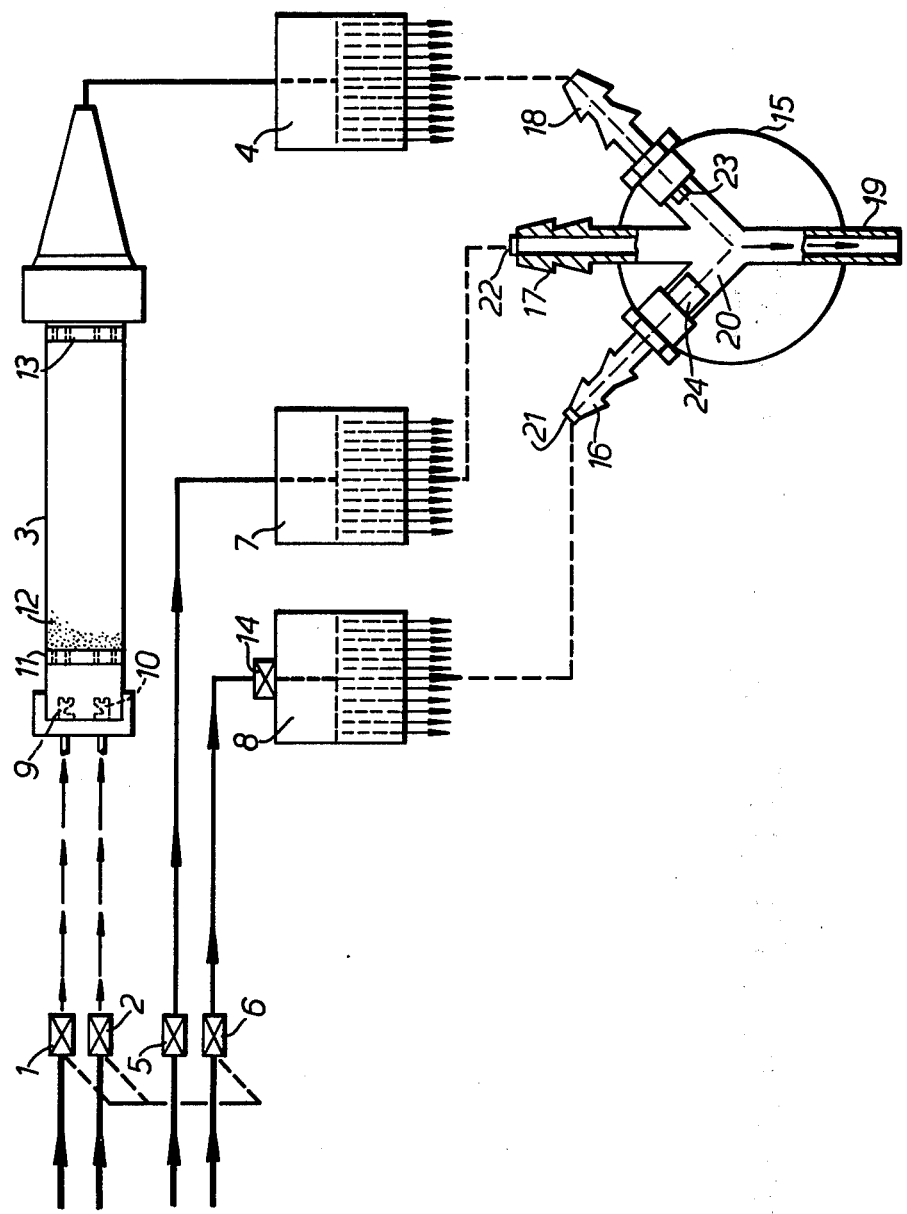

FOAM PRODUCING METHOD

BRIEF DESCRIPTION OF THE PRIOR ART

The present invention relates to methods and apparatus for successively dispensing quantities of an urea-formaldehyde foamed resin mixture, in particular a low density foamed resin mixture as used in the insulation of buildings.

Although the present invention has wide application, reference will hereinafter be confined to applications relating to the insulation of cavity walls of buildings and specifically to the provision of insulation in cavity building blocks.

BRIEF DESCRIPTION OF THE PRIOR ART

The insulation of cavity walls by injecting into the cavity a foam such as urea formaldehyde is well known. In known foam-producing equipment a hardener is foamed with air and the foam thus formed is mixed with a resin. The resinated foam is passed to its intended final location such as a wall cavity through a tube of, for example, three-quarters of an inch diameter and length of ten feet. The time taken for the foam to pass through the tube is sufficient to ensure that the foam gels rapidly within the cavity. If the length of the tube is reduced, the gel time within the cavity is increased and it is possible for the foam to collapse, for example, when one three feet deep layer is injected above a recently formed layer in a cavity.

As the result of increased interest in providing well insulated buildings, pre-cast building blocks are now being produced in which cavities filled with insulating material are provided. The known foam producing equipment has been adapted by passing a foamed resin mixture through a manifold having for example twelve relatively small diameter outlets. A problem has been found in that the adapted equipment is not satisfactory as the foamed resin mixture coagulates in the small diameter outlets, requiring frequent cleaning of the equipment, involving some dismantling of the equipment.

SUMMARY OF THE INVENTION

One object of the present invention is to provide a foam dispensing method and apparatus which obviate or mitigate the aforementioned problem.

According to one feature of the present invention a method of successively dispensing quantities of an urea formaldehyde foamed resin mixture having as constituents a resin component and a hardener component, comprises the steps of:

(a) causing one of said components to foam,
(b) feeding the foamed component and the other component independently and under pressure to a mixing chamber,
(c) allowing said components to mix in said chamber and thereafter dispensing the foamed resin mixture through an outlet duct from said chamber,
(d) shutting off the supply to the mixing chamber of the foamed component and the other component, and sweeping the mixing chamber and the outlet duct to remove therefrom residue of the foamed resin mixture.

According to another feature of the present invention, apparatus for successively dispensing quantities of an urea formaldehyde foamed resin mixture having as constituents a resin component and a hardener component, comprises a controllable pressurized supply of one of said components which component has been caused to foam, a controllable pressured supply of the other component, a mixing chamber having an outlet duct and having first and second inlets each connected to a different one of said supplies, respective valves operable to allow said components to flow to and mix in said mixing chamber and thereafter to be dispensed as a foamed resin mixture through said outlet duct, and means for sweeping the mixing chamber and the outlet duct to remove therefrom residue of the foamed resin mixture.

Either the resin component or the hardener component may be caused to foam before the components are mixed in the mixing chamber. Foaming of the selected component may be effected by admixture of either a blowing agent or air and, in the latter case, the foaming takes place in a foaming gun.

Sweeping of the mixing chamber and outlet duct may be effected either mechanically, passing a plunger through the mixing chamber and outlet duct, or by flushing with a fluid.

The apparatus may comprise a plurality of mixing heads each containing a mixing chamber and outlet duct. Each mixing head may be connected to the supplies of foamed resin mixture components through a manifold.

BRIEF DESCRIPTION OF THE DRAWING

The mixing head may comprise an outlet duct aligned with the air inlet, the resin and foam inlets being inclined to the outlet duct and opening into the outlet duct on opposite sides thereof. These and other features of the invention will be apparent from the following description of embodiments of the invention given by way of example only and with reference to the accompanying drawing, which schematically illustrates apparatus for simultaneously dispensing an urea formaldehyde foamed resin mixture to twelve locations.

DETAILED DESCRIPTION

Referring to the drawing, pressurized supplies of a hardener component and a resin component of a foamed resin mixture are controllable by valves 1 and 6, respectively. The hardener component is fed from the valve 1 to one input of a foaming gun 3 and pressurized air, controllable by a valve 2, is fed to the other input of the gun 3.

The foaming gun 3 (known per se) comprises flood jets 9 and 10 which direct jets of hardener and air together. The resulting air and hardener mixture is passed through a nylon honeycomb 11, a tube filled with ballotini 12, and a further nylon honeycomb 13. A low density detergent foam results which is passed to a manifold 4.

The resin component is fed from the valve 6 directly to a manifold 8. A further supply of pressurized air, controllable by a valve 5, is fed to a manifold 7. Valves 1, 2 and 6 are ganged together so that they operate in unison.

Each of the manifolds 4, 7 and 8 comprises a single inlet and twelve outlets to which the inlet flow is evenly distributed. The inlet of manifold 8 is provided with a fine control needle valve 14 so that the flow of resin can be accurately controlled.

Twelve mixing heads 15 are provided, only one of which is shown to simplify the drawing. Each mixing head comprises a resin inlet 16 connected to a respective outlet of manifold 8, an air inlet 17 connected to a respective outlet of manifold 7, and a foam inlet 18 connected to a respective outlet of the manifold 4. The inlet 17 is aligned with an outlet duct 19 and the inlets 16 and 18 are inclined to open into opposite sides of the conduit so as to define a mixing chamber 20. Non-return valves 21, 22 and 23 are provided in the inlets 16, 17 and 18, and a resin jet atomizing spray unit 24 is provided in the resin inlet 16.

In operation, the valves 1, 2 and 6 are opened simultaneously, valve 5 remaining closed. As a result, foam and resin are mixed in the mixing chamber 20 and a foamed resin mixture is dispensed from the outlet duct 19 to a desired location, for example a cavity in a pre-cast building block. Non-return valve 22 remains closed. When sufficient foamed resin mixture has been dispensed to fill the cavity, the valves 1, 2 and 6 are closed, stopping the flow of resin and foam into the mixing head. A residue of mixture is left in the mixing chamber 20 and duct 19, and this is flushed out by opening the valve 5. When the valve 5 is opened, air under pressure is supplied to the inlet 17 from the manifold 7, opening non-return valve 22 and closing non-return valves 21 and 23.

It has been found that when filling small cavities such as those provided in building blocks a very short outlet duct, e.g. two inches long, will suffice without danger of the foam collapsing due to insufficient gel time.

The twelve mixing heads, all similar to the mixing head 15, are secured in a rectangular array and located above a corresponding array of building block cavities, e.g. four contiguous blocks each having three cavities. Operation of the apparatus results in a predetermined quantity of foamed resin mixture being dispensed to fill each cavity after which the blocks are moved away and replaced by further blocks to be filled. The mixing chambers and outlet ducts may be swept after each dispensing operation or after two or more operations depending on the rapidity with which an unacceptable residue builds up in the mixing heads.

As an example of the constituents of the foamed resin mixture, the resin component could be Aerolite (Registered Trade Mark) U.L. 333 and the hardener component H.L. 703, both as supplied by CIBA-GEIGY (UK) LTD. Although in the foregoing description, the hardener component was mixed with air in the foaming gun, it may be preferred to mix the resin component with air in the foaming gun and to feed the hardener component directly to the mixing head. Normally the resin component as supplied by the manufacturer requires prior dilution, e.g. with water, but it may be used undiluted, known as "dry" urea formaldehyde resin. In this case the hardener would be, for example, phosphoric acid and one or other of the components would preferably be mixed with a low boiling blowing agent and fed directly to the mixing head, no foaming gun being employed.

Instead of supplying air to the mixing head inlet 17, either water or a solvent of the foamed resin mixture such as methylene chloride may be supplied for flushing the mixing chamber and outlet duct. Alternatively, in place of a fluid supply, the chamber and duct may be swept mechanically by a plunger fitting in the duct 19 and carried on a rod extending through the inlet 17 and reciprocated, as by a pneumatically-operated piston, to sweep said plunger through the mixing chamber 20 and the duct 19.

The schematically illustrated manifolds 4, 7 and 8 may comprise a central inlet with twelve radially extending outlets. If it was desired to supply more or less than twelve mixing heads 15, the number of outlets from the manifolds could be adjusted accordingly.

The valves 1, 2, 5 and 6 can be operated either manually or automatically, as by pneumatic control.

Clearly the methods and apparatus of the present invention may be used to dispense urea formaldehyde foam in many other applications in addition to the filling of building block cavities.

It should be noted that instead of mixing foamed hardener with resin in the chamber 20, the reverse is also possible e.g. foamed resin may be mixed with hardener in which case the spray unit 24 and the valve 23 would be transposed. It will be seen therefore that regardless of which method is selected, it is always the non-foamed material which is sprayed into the mixing chamber 20 unless dry urea formaldehyde foamed resin mixture is being dispensed, in which case, both inlets 16 and 18 would include a spray unit 24.

Although the apparatus just described includes non-return valves 21, 22, 23 in the inlets 16, 17, 18, it will be appreciated that on/off valves may be used. Furthermore, the valves need not necessarily be provided in the inlets 16, 17, 18 as they can be located anywhere between said inlets and the respective manifolds 4, 7, 8.

What we claim is:

1. In a method for successively dispensing discrete quantities of an urea formaldehyde foamed resin mixture having as constituents a resin component and a hardener component, including the steps of causing one of said components to foam, supplying the foamed component and the other component independently and under pressure to a mixing chamber, mixing said components in said chamber, and thereafter dispending a quantity of foamed resin mixture from said chamber through an outlet duct the length of which is of the same order as the dimensions of said chamber; the improvement which comprises the sequential steps of:
    (a) mixing said components in said chamber by spraying the unfoamed component onto the foamed component so that the cellular structure of the foamed component is retained;
    (b) dispensing a quantity of foamed resin mixture through said outlet duct;
    (c) interrupting the supply of said components to the mixing chamber;
    (d) sweeping the mixing chamber and the outlet duct to remove therefrom residue of said mixture; and
    (e) restoring the supply of said components to the mixing chamber so as to dispense a further quantity of the foamed resin mixture through said outlet duct.

2. A method as claimed in claim 1, wherein the step of sweeping tne mixing chamber and outlet duct is effected mechanically by passing a plunger through said chamber and duct.

3. A method as claimed in claim 1, wherein the step of sweeping the mixing chamber and outlet duct is effected by flushing said chamber and duct with one of the group of fluids comprising air, water and a solvent of the foamed resin mixture.

4. A method as claimed in claim 1 in which the step of sweeping the mixing chamber and outlet duct is effected after more than one discrete quantity of foamed resin mixture has been dispensed.

* * * * *